UNITED STATES PATENT OFFICE.

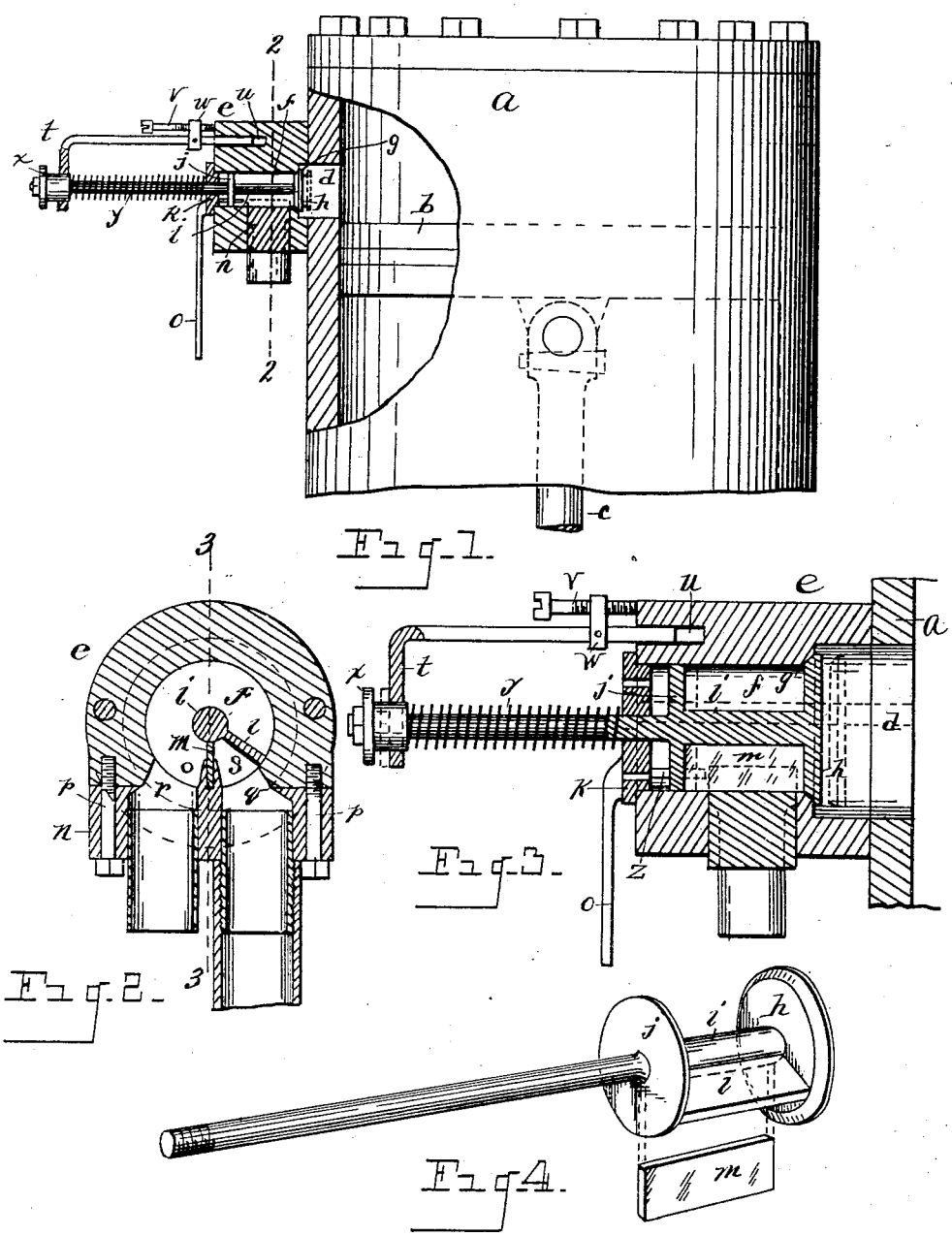

ALANSON P. BRUSH, OF DETROIT, MICHIGAN.

VALVE FOR GAS OR GASOLENE ENGINES.

SPECIFICATION forming part of Letters Patent No. 710,840, dated October 7, 1902.

Application filed October 4, 1900. Serial No. 31,991. (No model.)

*To all whom it may concern:*

Be it known that I, ALANSON P. BRUSH, a citizen of the United States, residing at Detroit, county of Wayne, State of Michigan, have invented a certain new and useful Improvement in Valves for Gas or Gasolene Engines; and I declare the following to be a full, clear, and exact description of the invention, such as will enable others skilled in the art to which it appertains to make and use the same, reference being had to the accompanying drawings, which form a part of this specification.

My invention has for its object an automatic proportioning inlet-valve for gas and gasolene engines; and it consists of the construction, combination, and arrangement of devices hereinafter described and claimed, and illustrated in the accompanying drawings, in which—

Figure 1 is a view, partly in elevation and partly in vertical section, illustrating features of my invention attached to the cylinder of a gas or gasolene engine, the section being on the line 3 3, Fig. 2. Fig. 2 is a view in cross-section on the line 2 2, Fig. 1. Fig. 3 is an enlarged view, in vertical section, through the valve and valve-case on the line 3 3, Fig. 2. Fig. 4 is a detail view in perspective of the valve and valve-stem.

The valve is of a vacuum-opening type.

A cylinder of a gas or gasolene engine is indicated at $a$, and $b$ denotes the piston-head, and $c$ its piston-rod. These parts may be of any desired construction. The cylinder is formed with a port $d$, with which the valve-case $e$ communicates. The interior of the valve-case $e$ is formed with two chambers $s$ and $f$, the case being constructed at the base of said chambers with a valve-seat, as at $g$, upon which seats my improved valve proper, (indicated at $h$,) the valve opening as shown. The valve-stem $i$ is provided at the upper ends of the chambers $s$ and $f$ with a disk or diaphragm $j$, the stem projecting through the cap $k$ of the valve-case. Extending from the valve $h$ to the disk or diaphragm $j$ is a wing $l$. An additional wing is indicated at $m$, held in place at its outer edge by a separable portion of the valve-case, (indicated at $n$,) to which the portion $e$ of the valve-case is united, as by bolts $p$. The wing $m$ is independent of the valve-stem $i$ and of the valve $h$ and diaphragm $j$, so that the valve-stem and the wing $l$ can be rotated to bring the wing $l$ nearer to the wing $m$ or farther away therefrom, as may be desired, to vary the proportions of free air and of gas or saturated air. This operation of rotating the valve-stem $i$ with the wing $l$ may be accomplished readily while the engine is in operation, if desired, the wings $l$ and $m$ being the proportioning-wings of the valve.

An admission-port for gas or saturated air is indicated at $q$, and $r$ is an admission-port for free air. The admission-port for gas or saturated air opens into the chamber $s$ between the proportioning-wings, while the port $r$ opens into the chamber $f$ outside said wings. The areas of the chambers $s$ and $f$ will always be greater than the areas of their respective openings into the cylinder when the valve is unseated, and the ratio of the discharges therefrom into the cylinder is regulated, as already observed, by regulating the arcs of the chambers $s$ and $f$. It will be evident that when the valve is unseated both the chambers $f$ and $s$ will open through the port $d$ into the cylinder. When the wings $l$ and $m$ are relatively adjusted, the proportions of gas or saturated air and free air are constant, while the mechanism may easily be adjusted whenever desired for varying the proportions.

The speed of the engine is controlled by means of an adjustable stop (indicated at $t$) through which the valve-stem $i$ may project, the stop being adjustable in any suitable manner. As shown, the stop is engaged at one end in a recess $u$ of the valve-case, an adjusting-screw $v$ being provided having a threaded engagement with a collar $w$ upon the stop $t$. In this manner the stop may be moved nearer to the case $e$ or away therefrom, as circumstances may require. The valve-stem is provided with a cap (indicated at $x$) to strike against the stop to limit the movement of the valve $h$ when unseated. A retracting-spring $y$ returns the valve to its seat. By means of the stop $t$ the valve $h$ may be allowed to open more or less, as may be desired. It will be seen that the adjustment of the valve by means of the stop $t$ may be effected without varying the proportions of the mixture admitted into the cylinder. The stop $t$ may be adjusted in any desired manner and might be attached to a governing device, if preferred.

The wings $l$ and $m$ are obviously in the nature of diaphragms, forming the chamber $s$ therebetween, the arc of opening from said chamber into the cylinder being variable by the adjustment of one of said wings or diaphragms.

It will be evident that in the operation of the valve the chambers $s$ and $f$ when the valve is unseated discharge independently into the cylinder through the port $d$. The lengths of the openings into the cylinder of the engine from the chambers $s$ and $f$ when the valve is unseated are equal to the lengths of the arcs of said chambers determined by the position of the two wings. By the adjustment of one of the wings, as hereinbefore described, the ratio of the areas of the two openings into the cylinder from the chambers $s$ and $f$ when the valve is unseated may be varied as desired, thus controlling the proportions of gas or saturated air to free air admitted to the cylinder. It will be observed that the ratio of the two areas—$i.\,e.$, the areas of the openings into the cylinder from the chambers $s$ and $f$—is at all times proportionate to the corresponding arcs.

To determine the area of the opening from each chamber into the cylinder when the valve is unseated, it will be evident that the arc of the chamber in cross-section is one dimension of the opening and that the distance the valve is allowed to unseat is the other dimension, the product of the two dimensions being the area of the corresponding opening. It will be evident that the distance the valve is allowed to unseat will be the same in regard to each opening, and therefore this dimension may be eliminated from consideration. Since this is true, the areas of the two openings will always be in proportion to their corresponding arcs, as hereinbefore indicated. It will be understood that the wing or diaphragm $m$ is longitudinally movable with the seating and unseating of the valve. The valve-stem, with the valve $h$, the diaphragm $j$, and the intervening wing $l$, may be rotated in any desired manner. As shown, the cap $k$ is provided with a pin $z$, engaging the diaphragm $j$, so that by turning said cap the diaphragm, with the wing $l$ and valve $h$, will be rotated accordingly. With the cap $k$, for example, may engage a lever $o$.

While I have described the valve as of the vacuum-opening type, I do not, however, confine myself solely thereto, as my invention contemplates the employment of the valve in any manner to which it may be found adapted—as, for example, where the valve is opened mechanically in the operation of the engine.

It will be observed that the invention consists, broadly, of a valve seated in a suitable case, said valve and case forming when the valve is unseated two independent chambers or passages discharging independently through the valve and case, the openings of said passages or chambers formed by the unseating of the valve being constructed at or made adjustable to a desired ratio of areas the one to the other, said ratio being constant regardless of the total area of the discharge-openings, which capacity may be governed by regulating the distance the valve may unseat.

What I claim as my invention is—

1. A vacuum-opening valve having in combination a valve-case formed with an interior passage, air and gas inlets to said passage, a partition or diaphragm between said inlets lengthwise of the passage, a rotatable valve seating at the base of the case, a second partition circularly movable with the valve within the case, whereby said passage is divided into air and gas chambers of relatively variable size.

2. The combination with a valve-case, of a valve seated in said case, wings or diaphragms forming a gas-chamber therebetween within said valve-case, a gas-port opening into said gas-chamber, and an air-port opening into the interior of the valve-case outside said chamber, one of said wings or diaphragms being adjustable nearer to or farther from the other wing or diaphragm.

3. The combination with a valve-case, of a valve seated in said case, a rotatable valve-stem connected with said valve, wings or diaphragms forming a gas-chamber therebetween within said valve-case, a port opening into said gas-chamber, and an air-port opening into the interior of the valve-case outside said chamber, one of said wings or diaphragms rotatable with the valve-stem.

4. The combination with a valve-case, of a valve seated in said case, a rotatable valve-stem connected with said valve, wings or diaphragms forming a chamber between said wings within said valve-case, a port opening into said chamber, and a port opening into the interior of the valve-case outside said chamber, one of said wings or diaphragms rotatable with the valve-stem, the other of said wings or diaphragms held in position between said ports.

5. The combination with a valve-case, of a valve seated in said case, a rotatable valve-stem connected with said valve, a wing or diaphragm carried by said valve-stem, an additional wing or diaphragm longitudinally movable with said valve-stem forming a chamber between said wings, a port opening into said chamber, and a port opening into the interior of the valve-case outside said chamber.

6. The combination with a valve-case, of a valve seated in said case, a rotatable valve-stem connected with said valve, a disk carried by said valve-stem spaced from the valve, a wing or diaphragm carried by said valve-stem between the valve and said disk, an additional wing or diaphragm forming a chamber within the valve-case between said wings or diaphragms, a port opening into said chamber, and a port opening into the interior of the valve-case outside said chamber.

7. The combination with a valve-casing having separate air and gas inlets, of a valve controlling the outlet, and partitions forming chambers in the casing and connected to the valve to be moved thereby in its seating and unseating, one of said partitions being movable with relation to the other to vary the relative sizes of the chambers.

8. A valve-casing having separate air and gas inlets, a partition in the casing between said inlets and dividing it into two chambers, a valve controlling the outlet, and a second partition carried by the valve and rotatably movable to vary the relative sizes of the chambers.

9. A valve-casing having separate air and gas inlets, a partition in the casing between said inlets and dividing it into two chambers, a valve controlling the outlet, and a second partition rotatably movable to vary the relative sizes of the chambers.

10. The combination of a valve-casing, separate inlets for air and gas, a suction-valve controlling the outlet, and means carried by the valve for proportioning the quantities of air and gas.

11. The combination of the valve-casing, separate inlets for air and gas, a suction-valve controlling the outlet, and means movable with the valve for proportioning the quantities of air and gas, said means being adjustable.

12. The combination of a valve-casing, separate passages for air and gas, a reciprocatory suction-valve controlling the outlet of said passages, and means carried by the valve for proportioning the quantities of air and gas, said valve being rotatably adjustable for controlling the proportions of air and gas regardless of the amount of the opening of the valve.

In testimony whereof I sign this specification in the presence of two witnesses.

ALANSON P. BRUSH.

Witnesses:
N. S. WRIGHT,
M. HICKEY.